United States Patent
Fultz et al.

(10) Patent No.: US 9,513,888 B1
(45) Date of Patent: Dec. 6, 2016

(54) VIRTUAL PRELOADS

(71) Applicant: Sprint Communications Company L.P., Overland Park, KS (US)

(72) Inventors: David K. Fultz, Raymore, MO (US); Dhananjay Indurkar, Overland Park, KS (US); Nathan Schwermann, Lawrence, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 103 days.

(21) Appl. No.: 14/168,007

(22) Filed: Jan. 30, 2014

(51) Int. Cl.
*G06F 9/445* (2006.01)
*H04W 4/00* (2009.01)

(52) U.S. Cl.
CPC ............... *G06F 8/61* (2013.01); *H04W 4/003* (2013.01)

(58) Field of Classification Search
None
See application file for complete search history.

(56) References Cited

U.S. PATENT DOCUMENTS

| | | |
|---|---|---|
| 5,950,200 A | 9/1999 | Sudai et al. |
| 6,064,975 A | 5/2000 | Moon et al. |
| 6,186,553 B1 | 2/2001 | Phillips et al. |
| 6,356,838 B1 | 3/2002 | Paul |
| 6,441,831 B1 * | 8/2002 | Abramowitz et al. ........ 715/716 |
| 6,622,016 B1 | 9/2003 | Sladek et al. |
| 6,647,260 B2 | 11/2003 | Dusse et al. |
| 6,882,290 B2 * | 4/2005 | French ................. G06Q 10/025 340/531 |
| 6,978,132 B1 | 12/2005 | Sladek et al. |
| 6,986,107 B2 | 1/2006 | Hanggie et al. |
| 7,031,437 B1 | 4/2006 | Parsons et al. |
| 7,046,998 B2 | 5/2006 | Verma et al. |
| 7,072,653 B1 | 7/2006 | Sladek et al. |
| 7,073,130 B2 | 7/2006 | Novak et al. |
| 7,215,754 B1 | 5/2007 | Woodson et al. |
| 7,260,382 B1 | 8/2007 | Lamb et al. |
| 7,260,386 B1 | 8/2007 | Haldar et al. |
| 7,409,208 B1 | 8/2008 | Clare et al. |

(Continued)

FOREIGN PATENT DOCUMENTS

| | | |
|---|---|---|
| WO | WO2009056148 A2 | 5/2009 |
| WO | WO2014022446 A1 | 2/2014 |

OTHER PUBLICATIONS

FAIPP Pre-Interview Communication dated Aug. 25, 2014, U.S. Appl. No. 13/940,251, filed Jul. 11, 2013.

(Continued)

*Primary Examiner* — Evral E Bodden

(57) ABSTRACT

A method of installing an application on a mobile communication device which comprises receiving, on a mobile communication device, a selection of a virtually preloaded application, identifying the repository from a plurality of repositories, communicating with the repository to obtain the full application, identifying a first location of an icon associated with the virtually preloaded application on the mobile communication device, relocating the icon associated with the virtually preloaded application to a second location, and installing the full application on the mobile communication device. The virtually preloaded application corresponds to a full application available in a repository.

19 Claims, 8 Drawing Sheets

(56) References Cited

U.S. PATENT DOCUMENTS

| | | | |
|---|---|---|---|
| 7,500,198 B2 | 3/2009 | Mathews et al. | |
| 7,552,432 B2* | 6/2009 | Aiba | 717/177 |
| 7,558,953 B2 | 7/2009 | Osthoff et al. | |
| 7,681,134 B1* | 3/2010 | Grechishkin | G06F 9/4443 709/205 |
| 7,702,322 B1 | 4/2010 | Maurya et al. | |
| 7,788,593 B1* | 8/2010 | Grechishkin et al. | 715/778 |
| 7,930,636 B2 | 4/2011 | Garbow et al. | |
| 7,970,386 B2 | 6/2011 | Bhat et al. | |
| 8,012,219 B2 | 9/2011 | Mendez et al. | |
| 8,150,962 B1 | 4/2012 | Wolter | |
| 8,244,277 B1 | 8/2012 | Cha et al. | |
| 8,265,658 B2 | 9/2012 | Issa et al. | |
| 8,270,310 B2 | 9/2012 | Raleigh | |
| 8,270,941 B2 | 9/2012 | Kenagy et al. | |
| 8,315,198 B2 | 11/2012 | Corneille et al. | |
| 8,359,016 B2 | 1/2013 | Lindeman et al. | |
| 8,468,164 B1 | 6/2013 | Paleja et al. | |
| 8,533,605 B1 | 9/2013 | Cha et al. | |
| 8,538,398 B2 | 9/2013 | Wilson et al. | |
| 8,559,933 B1 | 10/2013 | Delker et al. | |
| 8,577,334 B1 | 11/2013 | Smith et al. | |
| 8,577,737 B1* | 11/2013 | Amacker et al. | 705/26.1 |
| 8,583,091 B1 | 11/2013 | Delker et al. | |
| 8,589,911 B1 | 11/2013 | Sharkey et al. | |
| 8,650,096 B2* | 2/2014 | Van Buskirk | G06F 3/0486 705/26.1 |
| 8,819,639 B2 | 8/2014 | Schumacher | |
| 8,838,087 B1 | 9/2014 | Delker et al. | |
| 8,843,122 B1 | 9/2014 | Wick et al. | |
| 8,863,232 B1 | 10/2014 | Tidd | |
| 8,954,041 B1 | 2/2015 | Delker et al. | |
| 8,972,592 B1 | 3/2015 | Delker et al. | |
| 9,043,446 B1 | 5/2015 | Davis et al. | |
| 9,092,291 B1 | 7/2015 | Adib et al. | |
| 9,098,366 B1 | 8/2015 | Adib et al. | |
| 9,123,062 B1 | 9/2015 | Delker et al. | |
| 9,189,607 B1 | 11/2015 | Wick et al. | |
| 9,357,378 B1 | 5/2016 | Delker et al. | |
| 9,386,395 B1 | 7/2016 | Delker et al. | |
| 9,398,462 B1 | 7/2016 | Delker et al. | |
| 9,413,839 B2 | 8/2016 | Annan et al. | |
| 9,442,709 B1 | 9/2016 | Delker et al. | |
| 2002/0029169 A1 | 3/2002 | Oki et al. | |
| 2002/0054086 A1 | 5/2002 | Van Oostenbrugge et al. | |
| 2002/0054150 A1 | 5/2002 | I'Anson et al. | |
| 2002/0101444 A1 | 8/2002 | Novak et al. | |
| 2002/0123335 A1 | 9/2002 | Luna et al. | |
| 2002/0142760 A1 | 10/2002 | Gidron et al. | |
| 2002/0167542 A1 | 11/2002 | Florin | |
| 2003/0233329 A1 | 12/2003 | Laraki et al. | |
| 2004/0044752 A1 | 3/2004 | Hamaguchi et al. | |
| 2004/0113940 A1 | 6/2004 | Brockway et al. | |
| 2004/0148598 A1* | 7/2004 | Kita et al. | 717/170 |
| 2004/0171375 A1 | 9/2004 | Chow-Toun | |
| 2004/0179034 A1 | 9/2004 | Burritt | |
| 2004/0181678 A1 | 9/2004 | Lee et al. | |
| 2004/0203941 A1 | 10/2004 | Kaplan et al. | |
| 2004/0216054 A1 | 10/2004 | Mathews et al. | |
| 2005/0050474 A1 | 3/2005 | Bells et al. | |
| 2005/0055696 A1 | 3/2005 | Betzler et al. | |
| 2005/0071780 A1 | 3/2005 | Muller et al. | |
| 2005/0085272 A1 | 4/2005 | Anderson et al. | |
| 2006/0048141 A1 | 3/2006 | Persson et al. | |
| 2006/0085751 A1 | 4/2006 | O'Brien et al. | |
| 2006/0092861 A1 | 5/2006 | Corday et al. | |
| 2006/0150256 A1 | 7/2006 | Fanton et al. | |
| 2006/0168340 A1 | 7/2006 | Heller et al. | |
| 2006/0190569 A1 | 8/2006 | Neil et al. | |
| 2006/0235760 A1* | 10/2006 | Sanjar et al. | 705/26 |
| 2006/0258289 A1 | 11/2006 | Dua | |
| 2006/0277469 A1 | 12/2006 | Chaudhri et al. | |
| 2007/0067738 A1 | 3/2007 | Flynt et al. | |
| 2007/0088851 A1 | 4/2007 | Levkovitz et al. | |
| 2007/0109580 A1 | 5/2007 | Yoshida | |
| 2007/0130156 A1 | 6/2007 | Tenhunen et al. | |
| 2007/0143740 A1 | 6/2007 | Hoerentrup et al. | |
| 2007/0265023 A1 | 11/2007 | Bengtsson et al. | |
| 2007/0268842 A1 | 11/2007 | Wang | |
| 2007/0282914 A1 | 12/2007 | Sivapragasam et al. | |
| 2008/0010133 A1 | 1/2008 | Pyhalammi et al. | |
| 2008/0034309 A1 | 2/2008 | Louch et al. | |
| 2008/0092057 A1 | 4/2008 | Monson et al. | |
| 2008/0160970 A1 | 7/2008 | Srinivas Reddy et al. | |
| 2008/0192714 A1 | 8/2008 | Kim et al. | |
| 2008/0214172 A1 | 9/2008 | Anwer | |
| 2008/0276182 A1 | 11/2008 | Leow | |
| 2008/0305775 A1 | 12/2008 | Aaltonen et al. | |
| 2008/0319887 A1 | 12/2008 | Pizzi et al. | |
| 2009/0017870 A1 | 1/2009 | An | |
| 2009/0064055 A1 | 3/2009 | Chaudhri et al. | |
| 2009/0077495 A1 | 3/2009 | Bhat et al. | |
| 2009/0181716 A1 | 7/2009 | Benco et al. | |
| 2009/0186651 A1 | 7/2009 | You | |
| 2009/0199176 A1 | 8/2009 | Nath et al. | |
| 2009/0228824 A1 | 9/2009 | Forstall et al. | |
| 2009/0254753 A1 | 10/2009 | De Atley et al. | |
| 2009/0259974 A1 | 10/2009 | Lin | |
| 2009/0260004 A1 | 10/2009 | Datta et al. | |
| 2009/0288079 A1* | 11/2009 | Zuber et al. | 717/176 |
| 2009/0291674 A1 | 11/2009 | Choi | |
| 2009/0307679 A1 | 12/2009 | Lee et al. | |
| 2010/0005196 A1 | 1/2010 | Wolff-Petersen | |
| 2010/0030901 A1 | 2/2010 | Hallberg et al. | |
| 2010/0037204 A1 | 2/2010 | Lin et al. | |
| 2010/0058431 A1 | 3/2010 | McCorkendale et al. | |
| 2010/0060549 A1 | 3/2010 | Tsern | |
| 2010/0087175 A1 | 4/2010 | Roundtree | |
| 2010/0115438 A1 | 5/2010 | Chu | |
| 2010/0121567 A1 | 5/2010 | Mendelson | |
| 2010/0184422 A1 | 7/2010 | Ahrens | |
| 2010/0190478 A1 | 7/2010 | Brewer et al. | |
| 2010/0197219 A1 | 8/2010 | Issa et al. | |
| 2010/0234051 A1 | 9/2010 | Holden et al. | |
| 2010/0269107 A1* | 10/2010 | Jung et al. | 717/176 |
| 2010/0281427 A1 | 11/2010 | Ghosh et al. | |
| 2010/0311468 A1 | 12/2010 | Shi et al. | |
| 2011/0034160 A1* | 2/2011 | Corda et al. | 455/418 |
| 2011/0072121 A1 | 3/2011 | Takasugi et al. | |
| 2011/0161149 A1 | 6/2011 | Kaplan | |
| 2011/0161484 A1 | 6/2011 | Van den Bogaert et al. | |
| 2011/0208822 A1 | 8/2011 | Rathod | |
| 2011/0210933 A1 | 9/2011 | Forstall | |
| 2011/0238496 A1 | 9/2011 | Gurbuxani et al. | |
| 2011/0258301 A1 | 10/2011 | McCormick et al. | |
| 2011/0295980 A1 | 12/2011 | Aldis et al. | |
| 2011/0312387 A1 | 12/2011 | Heo et al. | |
| 2011/0314389 A1 | 12/2011 | Meredith et al. | |
| 2012/0016735 A1 | 1/2012 | Park et al. | |
| 2012/0054022 A1 | 3/2012 | Kosashvili | |
| 2012/0072311 A1 | 3/2012 | Khan | |
| 2012/0102428 A1 | 4/2012 | Stewart | |
| 2012/0102547 A1 | 4/2012 | Fransdonk | |
| 2012/0117478 A1 | 5/2012 | Vadde et al. | |
| 2012/0155292 A1 | 6/2012 | Zazula et al. | |
| 2012/0272178 A1 | 10/2012 | Oygard et al. | |
| 2013/0013671 A1 | 1/2013 | Relan et al. | |
| 2013/0080911 A1 | 3/2013 | Klemm | |
| 2013/0097654 A1 | 4/2013 | Aciicmez et al. | |
| 2013/0275915 A1 | 10/2013 | Wang | |
| 2013/0294307 A1 | 11/2013 | Johansson et al. | |
| 2014/0036697 A1 | 2/2014 | Annan et al. | |
| 2014/0047559 A1 | 2/2014 | Vera et al. | |
| 2014/0068779 A1 | 3/2014 | Tan et al. | |
| 2014/0127662 A1 | 5/2014 | Kron et al. | |
| 2014/0173462 A1 | 6/2014 | Mattingly et al. | |
| 2014/0298320 A1* | 10/2014 | Xu et al. | 717/174 |
| 2015/0011311 A1 | 1/2015 | Relan et al. | |

(56) References Cited

U.S. PATENT DOCUMENTS

2015/0304506 A1  10/2015  Zhu et al.
2015/0331590 A1  11/2015  Yasui
2015/0370428 A1  12/2015  Chan et al.

OTHER PUBLICATIONS

First Action Interview Office Action dated Oct. 17, 2014, U.S. Appl. No. 13/940,251, filed Jul. 11, 2013.
Notice of Allowance dated Mar. 9, 2015, U.S. Appl. No. 13/940,251, filed Jul. 11, 2013.
FAIPP Pre-Interview Communication dated Aug. 25, 2014, U.S. Appl. No. 13/940,253, filed Jul. 11, 2013.
First Action Interview Office Action dated Oct. 17, 2014, U.S. Appl. No. 13/940,253, filed Jul. 11, 2013.
Notice of Allowance dated Mar. 6, 2015, U.S. Appl. No. 13/940,253, filed Jul. 11, 2013.
Mehrotra, et al., "SenSocial: a Middleware for Integrating Online Social Networks and Mobile Sensing Data Streams," ACM, Middleware '14, Dec. 8-12, 2014, Bordeaux, France.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
Pre-Interview Communication dated Jun. 8, 2015, U.S. Appl. No. 14/476,339, filed Sep. 3, 2014.
Notice of Allowance dated Jul. 16, 2015, U.S. Appl. No. 14/476,339, filed Sep. 3, 2014.
Pre-Interview Communication dated Aug. 8, 2014, U.S. Appl. No. 13/659,889, filed Oct. 24, 2012.
First Action Interview dated Oct. 15, 2014, U.S. Appl. No. 13/659,889, filed Oct. 24, 2012.
Final Office Action dated May 18, 2015, U.S. Appl. No. 13/659,889, filed Oct. 24, 2012.
Advisory Action dated Jul. 27, 2015, U.S. Appl. No. 13/659,889, filed Oct. 24, 2012.
Office Action—Restriction Requirement dated Aug. 26, 2013, U.S. Appl. No. 13/031,123, filed Feb. 18, 2011.
Office Action dated Dec. 17, 2013, U.S. Appl. No. 13/031,123, filed Feb. 18, 2011.
Office Action dated Oct. 10, 2014, U.S. Appl. No. 13/031,123, filed Feb. 18, 2011.
Notice of Allowance dated Apr. 22, 2015, U.S. Appl. No. 13/031,123, filed Feb. 18, 2011.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Apr. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2009, U.S. Appl. No. 11/333,964, filed Jan. 17, 2006.
Advisory Action dated Apr. 13, 2009, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Delker, Jason R., et al., Patent Application entitled "Dynamic Loading, Unloading, and Caching of Alternate Complete Interfaces," filed Sep. 30, 2013, U.S. Appl. No. 14/042,707.
Katzer, Robin Dale, et al., Patent Application entitled "Zone Architecture for Dynamic Targeted Content Creation," filed Oct. 11, 2011, U.S. Appl. No. 13/271,207.
Wick, Ryan A., et al., Patent Application entitled "Mobile Phone Controls Preprocessor" filed on Sep. 3, 2014, U.S. Appl. No. 14/476,339.
Delker, Jason R., et al., Patent Application entitled "Transition Experience During Loading and Updating an Interface and Applications Pack," filed Oct. 24, 2012, U.S. Appl. No. 13/659,889.
Schwermann, Nathan M., et al., entitiled "Methods for Customization of Default Applications on a Mobile Communication Device," filed Apr. 30, 2015, U.S. Appl. No. 14/701,156.
Delker, Jason R., et al., Patent Application entitled "Ad Sponsored Communication Pack," filed Feb. 18, 2011, U.S. Appl. No. 13/031,123.
Ackerman, Samuel K., "Lecture Slides: Mapping User Interlace Design to Culture Dimensions", Aaron Marcus and Associates, Inc., 2001.
Hollister, Sean, "Apple patent app hints at iPod-based phones, Peel 520 turns shades of green, red, blue and yellow," Engadget, http://www.engadgetcom/2010/09/19/apple-patent-app-hints-at-ipod-based-phones-peel-520-turns-shad/, Sep. 19, 2010, p. 1.
Kenja's Newsletter, About Newsletter, http://kenja.net/news.main.html, printed from the World Wide Web, "last modified Fri., Oct. 10, 2003".
Openwave, "Comparison of WAP Push and Short Message Service (SMS)," Openwave Systems, Inc., Redwood City, CA, Apr. 2002.
Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
Foreign Communication From a Related Counterpart Application—International Search Report and Written Opinion dated Oct. 4, 2013, PCT/US2013/052805 filed on Jul. 24, 2013.
Foreign Communication From a Related Counterpart Application—International Preliminary Report on Patentability dated Feb. 12, 2015, PCT/US2013/052805 filed on Jul. 24, 2013.
Pre-Interview Communication dated Apr. 24, 2012, U.S. Appl. No. 12/876,220, filed Sep. 6, 2010.
FAIPP Office Action dated Jan. 24, 2014, U.S. Appl. No. 12/876,220, filed Sep. 6, 2010.
Final Office Action dated Mar. 20, 2014, U.S. Appl. No. 12/876,220, filed Sep. 6, 2010.
Notice of Allowance dated May 6, 2014, U.S. Appl. No. 12/876,220, filed Sep. 6, 2010.
Pre-Interview Communication dated Feb. 26, 2013, U.S. Appl. No. 13/023,486, filed Feb. 8, 2011.
Notice of Allowance dated Jun. 4, 2013, U.S. Appl. No. 13/023,486, filed Feb. 8, 2011.
Pre-Interview Communication dated Mar. 28, 2014, U.S. Appl. No. 14/019,053, filed Sep. 5, 2013.
Notice of Allowance dated Aug. 13, 2014, U.S. Appl. No. 14/019,053, filed Sep. 5, 2013.
Office Action—Restriction Requirement dated Feb. 1, 2012, U.S. Appl. No. 12/876,221, filed Sep. 6, 2010.
Office Action dated May 10, 2012, U.S. Appl. No. 12/876,221, filed Sep. 6, 2010.
Final Office Action dated Jan. 11, 2013, U.S. Appl. No. 12/876,221, filed Sep. 6, 2010.
Advisory Action dated Apr. 23, 2013, U.S. Appl. No. 12/876,221, filed Sep. 6, 2010.
Notice of Allowance dated Jul. 2, 2013, U.S. Appl. No. 12/876,221, filed Sep. 6, 2010.
Pre-Interview Communication dated Jul. 19, 2012, U.S. Appl. No. 13/018,083, filed Jan. 31, 2011.

(56) References Cited

OTHER PUBLICATIONS

Final Office Action dated May 10, 2013, U.S. Appl. No. 13/018,083, filed Jan. 31, 2011.
Advisory Action dated Aug. 6, 2013, U.S. Appl. No. 13/018,083, filed Jan. 31, 2011.
Office Action dated Dec. 26, 2013, U.S. Appl. No. 13/018,083, filed Jan. 31, 2011.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Sep. 23, 2014, U.S. Appl. No. 13/018,083, filed Jan. 31, 2011.
Pre-Interview Communication dated Feb. 26, 2013, U.S. Appl. No. 13/118,058, filed May 27, 2011.
First Action Interview Office Action dated May 6, 2013, U.S. Appl. No. 13/118,058, filed May 27, 2011.
Final Office Action dated Sep. 10, 2013, U.S. Appl. No. 13/118,058, filed May 27, 2011.
Advisory Action dated Nov. 22, 2013, U.S. Appl. No. 13/118,058, filed May 27, 2011.
Office Action dated Mar. 18, 2014, U.S. Appl. No. 13/118,058, filed May 27, 2011.
Notice of Allowance dated Oct. 22, 2014, U.S. Appl. No. 13/118,058, filed May 27, 2011.
Supplemental Notice of Allowance dated Dec. 3, 2014, U.S. Appl. No. 13/118,058, filed May 27, 2011.
Pre-Interview Communication dated Aug. 6, 2014, U.S. Appl. No. 13/045,292, filed Mar. 10, 2011.
First Action Interview Office Action dated Oct. 10, 2014, U.S. Appl. No. 13/045,292, filed Mar. 10, 2011.
Notice of Allowance dated Jan. 6, 2015, U.S. Appl. No. 13/045,292, filed Mar. 10, 2011.
Office Action dated Dec. 17, 2014, U.S. Appl. No. 13/563,709, filed Jul. 31, 2012.
Final Office Action dated Jun. 23, 2015, U.S. Appl. No. 13/563,709, filed Jul. 31, 2012.
Pre-Interview Communication dated Jun. 9, 2014, U.S. Appl. No. 13/271,207, filed Oct. 11, 2011.
FAIPP Office Action dated Dec. 2, 2014, U.S. Appl. No. 13/271,207, filed Oct. 11, 2011.
Final Office Action dated Jun. 4, 2015, U.S. Appl. No. 13/271,207, filed Oct. 11, 2011.
Notice of Allowance dated Mar. 30, 2012, U.S. Appl. No. 13/029,103, filed Feb. 16, 2011.
Notice of Allowance dated Apr. 29, 2013, U.S. Appl. No. 13/537,563, filed Jun. 29, 2012.
Office Action dated Mar. 14, 2013, U.S. Appl. No. 13/161,496, filed Jun. 16, 2011.
Notice of Allowance dated Jun. 27, 2013, U.S. Appl. No. 13/161,496, filed Jun. 16, 2011.
Pre-Interview Communication dated Mar. 21, 2014, U.S. Appl. No. 13/537,610, filed Jun. 29, 2012.
Notice of Allowance dated May 18, 2014, U.S. Appl. No. 13/537,610, filed Jun. 29, 2012.
Office Action dated Sep. 15, 2015, U.S. Appl. No. 13/563,709, filed Jul. 31, 2012.
Advisory Action dated Oct. 29, 2015, U.S. Appl. No. 13/271,207, filed Oct. 11, 2011.
Office Action dated Oct. 1, 2015, U.S. Appl. No. 14/701,156, filed Apr. 30, 2015.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Pre-Interview Communication dated Dec. 1, 2015, U.S. Appl. No. 14/042,707, filed Sep. 30, 2013.
Notice of Allowance dated Feb. 8, 2016, U.S. Appl. No. 14/042,707, filed Sep. 30, 2013.
Advisory Action dated Jan. 29, 2016, U.S. Appl. No. 13/563,709, filed Jul. 31, 2012.
Office Action dated Dec. 1, 2015, U.S. Appl. No. 13/659,889, filed Oct. 24, 2012.
Final Office Action dated Feb. 8, 2016, U.S. Appl. No. 14/701,156, filed Apr. 30, 2015.
Notice of Allowance dated Mar. 1, 2016, U.S. Appl. No. 13/563,709, filed Jul. 31, 2012.
Office Action dated Mar. 14, 2016, U.S. Appl. No. 13/271,207, filed Oct. 11, 2011.
Notice of Allowance dated May 4, 2016, U.S. Appl. No. 13/659,889, filed Oct. 24, 2012.
Advisory Action dated Apr. 15, 2016, U.S. Appl. No. 14/701,156, filed Apr. 30, 2015.
Delker, Jason R., et al. "Network Access Tiered Based on Application Launcher Installation," filed May 25, 2016, U.S. Appl. No. 15/164,530.
Habiger, Matthew, "Systems and Methods for Customized Delivery of Virtually Installed Applications," filed Aug. 9, 2016, U.S. Appl. No. 15/232,569.
Final Office Action dated Aug. 4, 2016, U.S. Appl. No. 13/271,207, filed Oct. 11, 2011.
Notice of Allowance dated Jun. 20, 2016, U.S. Appl. No. 14/701,156, filed Apr. 30, 2015.

\* cited by examiner

VIRTUAL PRELOADS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices such as mobile phones and smart phones may be capable of running a plurality of software applications. Software applications include social media applications, weather applications, sports applications, gaming applications, map applications, and a wide variety of other applications. Executing software applications may provide a user of the mobile communication device with functionality that would be otherwise unavailable or inconvenient on the mobile communication device. For example, the user may find it convenient to use a software application to directly access a social media site rather than accessing the social media site manually by searching the Internet. Software applications may be installed at the time of manufacture or by the user of the mobile communication device.

SUMMARY

In an embodiment, a method of installing an application on a mobile communication device comprises receiving, on a mobile communication device, a selection of a virtually preloaded application, identifying the repository from a plurality of repositories, communicating with the repository to obtain the full application, identifying a first location of an icon associated with the virtually preloaded application on the mobile communication device, relocating the icon associated with the virtually preloaded application to a second location, and installing the full application on the mobile communication device. The virtually preloaded application corresponds to a full application available in a repository.

In an embodiment, a method of virtually preloading an application on a mobile communication device comprises receiving a full application file, identifying a unique application identifier, an application name, and an icon associated with the full application file, constructing a virtual application based on the unique application identifier, the application name, and the icon, and loading the virtual application onto the mobile communication device. The virtual application is configured to be represented on a display of the mobile communication device by the icon, stored under a name related to the application name, and identify a repository comprising the full application file based on the unique application identifier.

In an embodiment, a method of tracking an application installation on a mobile communication device comprises receiving, on a mobile communication device, a selection of a virtually preloaded application, identifying the repository from a plurality of repositories, communicating with the repository to obtain the full application, installing the full application on the mobile communication device, tracking, by a tracking application, at least one of the selection of the virtually preloaded application or the installation of the full application on the mobile communication device. The virtually preloaded application corresponds to a full application available in a repository.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
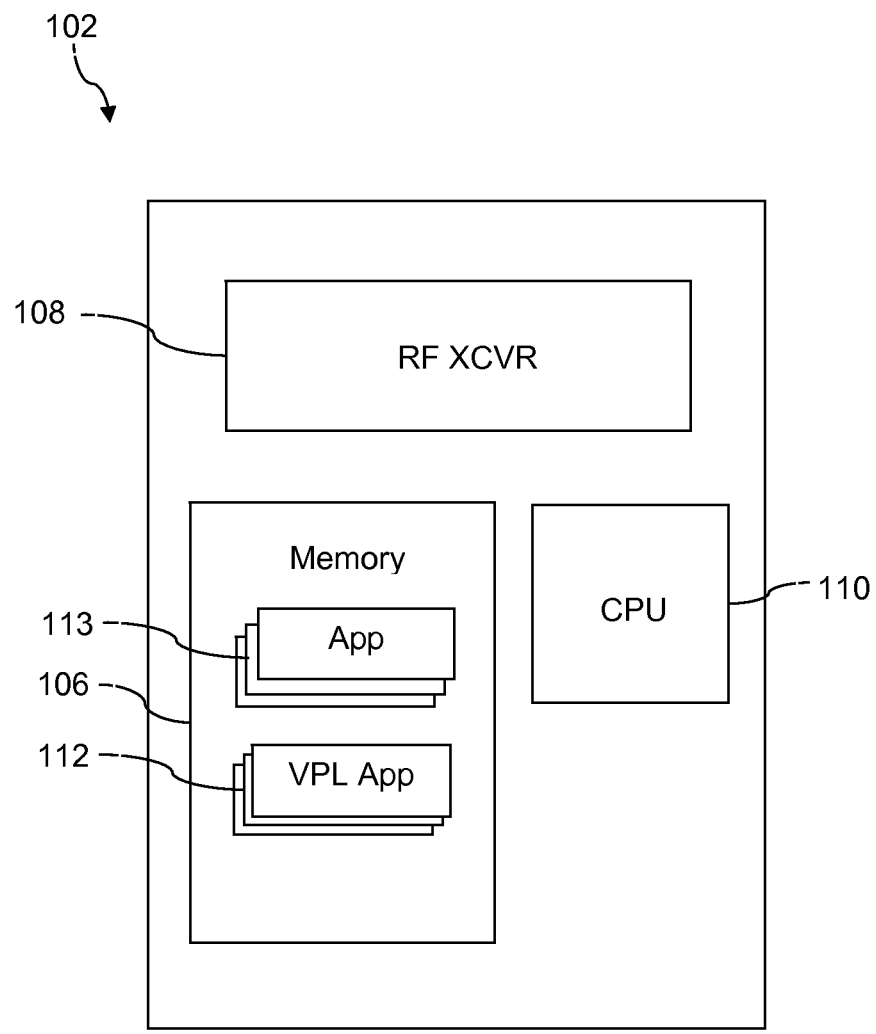
FIG. 1 is a block diagram of a mobile communication device according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, virtually preloading applications on a mobile communication device is described. Applications such as social media applications, weather applications, sports applications, gaming applications, and/or other applications are sometimes installed on mobile communication devices such as mobile phones or smart phones. Installed applications may provide a mobile communication device with functionalities that would be otherwise unavailable and may allow a user of the mobile communication device to access functionalities directly without performing a manual search. For example, the user may use a weather application to quickly view a local forecast rather than manually searching the Internet for the local forecast. Applications may be installed by the user or preloaded at the time of manufacture.

The user may be more likely to use a given application if it is preloaded on the mobile communication device. This may be because the user would not have had knowledge of the application if it were not preloaded on the mobile communication device, it may be because preloaded applications are more visible to the user, or it may be because of some other reason. Application providers seeking to increase consumer use of their applications may desire to have their applications preloaded on mobile communication devices. It is known that running applications on a mobile communication device has an associated overhead cost e.g., reduced battery life, reduced active memory, reduced storage space, etc. While application providers may want their applications to be preloaded, mobile communication device users may wish to avoid an inconvenient increase in overhead by limiting installation of undesired applications. In some cases, mobile communication device users may wish to exercise some control over which applications are installed.

The present disclosure teaches virtually preloading applications by preloading virtual applications in place of corresponding installable applications as an alternative to pre-installation of those applications. For the purposes of this disclosure, installable applications may comprise applications not yet installed on the mobile communication device and/or applications not yet installed that are available from an application repository. Virtually preloaded applications may be separate applications from the installable applications to which they correspond and may take up less memory and use less overhead than the installable applications to which they correspond.

Each virtually preloaded application may be configured to be represented by an interactive thumbnail image on a display of a mobile communication device, wherein the interactive thumbnail image may comprise an image, logo, symbol, phrase, or something else associated with the installable application to which the virtually preloaded application corresponds. The virtually preloaded applications may be represented on the display such that a user can identify that their corresponding installable applications have not yet been installed.

In an embodiment, the virtually preloaded applications may be configured to manage the installation of the installable applications to which they correspond. For example, a virtually preloaded application corresponding to an installable weather application may be configured to manage the installation of the weather application. In an embodiment, the virtually preloaded applications may be called by selection of interactive thumbnail images on a display of a mobile communication device. The virtually preloaded applications may provide access to an application repository such that, in response to selecting the interactive thumbnail image, a user may be presented with the option to install an installable application corresponding to the virtually preloaded application called by the selection of the interactive thumbnail image. The user may satisfy installation permissions and install the installable application. The virtually preloaded application corresponding to the installable application installed by the user may be configured to detect the installation of its corresponding installable application and may relocate from its pre-installation position on the display in order to land its corresponding installable application in that position. From a user perspective, the installation of the installable application may occur in the background and therefore appear seamless, thereby enhancing the user experience.

A tracking application may be configured to track and/or record interaction information for interactions between the user of the mobile communication device and the virtually preloaded applications and/or their replacement installable applications. For example, the tracking application may track and/or record the downloading of the installable application, a selection frequency, a movement or relocation of the virtually preloaded application by the user of the mobile communication device, a location of the virtually preloaded application or the installable application at the time it was selected, and/or a deletion of the virtually preloaded application and/or the installable application. The tracking application may be configured to transmit interaction information to a third party such as a mobile service provider, an application provider, a data store, or to some other third party.

It is expected that both mobile communication device users and application providers may benefit from virtually preloaded applications. Virtually preloaded applications may result in less overhead costs for mobile communication device users than directly preinstalled applications. Mobile communication device users may benefit from increased control over what applications get installed compared to direct pre-installation. Virtually preloaded applications may serve to expose mobile communication device users to installable applications, increase the likelihood of installation and use, etc. Thus, application providers may derive substantially similar benefits from virtually preloaded applications as they would from directly preinstalled applications, but these benefits may be had at a reduced overhead cost to mobile communication device users which may improve customer satisfaction. Further, the additional tracking options may provide additional feedback to the application providers or mobile communication providers on the use of the virtually preloaded applications and/or the installable applications.

Turning now to FIG. 1, a mobile communication device 102 is described. In an embodiment, the mobile communication device 102 comprises a radio frequency transceiver (RF XCVR) 108, a processor (CPU) 110, and a memory 106. The memory 106 may comprise one or more virtually preloaded applications (VPL App) 112 and one or more installed applications 113. In an embodiment, the installed applications 113 may comprise applications installed at the time of manufacture, applications installed by a user of the mobile communication device 102, applications installed by invoking a virtually preloaded application 112, or combinations thereof. The mobile communication device 102 may comprise a mobile phone, a smart phone, a personal digital assistant, a media player, a laptop computer, a notebook computer, or other mobile communication device.

In an embodiment, the one or more virtually preloaded applications 112 may be preloaded onto the mobile communication device 102. The virtually preloaded applications 112 may be preloaded onto the mobile communication device 102 at the time of manufacture, in conjunction with the download of an interface and applications pack, as part of an interface and applications pack, or at some other time. In some contexts, preloading may be considered to be loading the virtually preloaded applications 112 at any time prior to installation of the installable applications to which they correspond.

In some cases, the virtually preloaded applications 112 preloaded on the mobile communication device 102 may be determined by interface and applications packs that a user of the mobile communication device 102 had downloaded. For example, a virtually preloaded application 112 corresponding to an installable gaming application may be preloaded onto the mobile communication device 102 when a user of the mobile communication device 102 downloads a gaming interface and applications pack.

For further details about interface and applications packs, see U.S. patent application Ser. No. 12/876,220, filed Sep. 6, 2010, entitled "Provisioning System and Methods for Interfaceless Phone," by Jason R. Delker, et al.; U.S. patent application Ser. No. 13/023,486, filed Feb. 8, 2011, entitled "System and Method for ID Platform," by Jason R. Delker, et al.; U.S. patent application Ser. No. 12/876,221, filed Sep. 6, 2010, entitled "Dynamic Loading, Unloading, and Caching of Alternate Complete Interfaces," by Jason R. Delker, et al.; and U.S. patent application Ser. No. 13/118,058 filed May 27, 2011, entitled "Extending ID to a Computer System," by Jason R. Delker, et al., all of which are incorporated herein by reference in their entirety.

The virtually preloaded applications 112 may correspond to installable applications in one or more application repositories such as application stores and application marketplaces, where the application repositories may be online repositories. The virtually preloaded applications 112 may be separate applications from the installable applications to which they correspond and may perform different functionalities. In some cases, the virtually preloaded applications 112 may be smaller applications that use less overhead than their corresponding installable applications.

In general, the virtually preloaded application 112 may comprise an application that allows for the corresponding installable application to be located and downloaded to the mobile communication device 102. The virtually preloaded application 112 can include some functionality associated with the corresponding installable application, but in some embodiments may only enable the installable application to be obtained. As described in more detail below, the virtually preloaded application 112 can execute on a processor on the mobile communication device 102 to identify the repository containing the corresponding installable application, communicate with the repository, obtain permission to obtain the installable application, and enable the installable application to be downloaded from the repository.

In an embodiment, the virtually preloaded application 112 comprises an application name associated with the corresponding installable application, an application name associated with the corresponding installable application, and a unique application identifier that can be used to determine a location, source, or origin (e.g., a repository of a plurality of repositories) of the installable application. The virtually preloaded application 112 may comprise the application name of the installable application to which it corresponds and may be represented on a display of the mobile communication device 102 by an interactive thumbnail image associated with the installable application. The application name may be modified to some degree to differentiate the virtual preloaded application version from the installable application version. In an embodiment, a virtually preloaded application 112 may be suffixed to identify it as a virtual preload of its corresponding installable application. For example, a virtually preloaded application 112 of "weatherapplication" may be suffixed as "weatherapplication.vpl," wherein ".vpl" may comprise a suffix that serves to identify a virtually preloaded application 112. The suffix may be affixed to the unique application identifier of the virtually preloaded application 112 and/or elsewhere.

Further, the application name and icon may be used to represent that the virtual preloaded application represents the installable application, or in some embodiments, is the installable application itself. For example, the interactive thumbnail image may comprise an icon, logo, phrase, symbol, or something else associated with the installable application. In some cases, a user of the mobile communication device 102 may be unable to tell the difference between a virtually preloaded application 112 represented on the display and the installable application to which the virtually preloaded application 112 corresponds due to the similar appearance on the mobile communication device 102.

Alternatively, the virtually preloaded application 112 may be represented to the user in such a way that the user may identify that the corresponding installable application has not yet been installed on the mobile communication device 102. Similarly, the virtually preloaded application 112 may be represented such that it may be distinguished from installed applications 113. Distinguishing virtually preloaded applications 112 from installed applications 113 and/or representing virtually preloaded applications 112 such that users may identify that corresponding installable applications have not yet been installed may be accomplished by representing the virtually preloaded applications 112 with slightly transparent interactive thumbnail images, presenting interactive thumbnail images representing virtually preloaded applications 112 as less than full color, adding some overlay to interactive thumbnail images representing virtually preloaded applications 112, displaying text configured to indicate the presence of virtually preloaded applications 112, and/or through other indications.

In an embodiment, each of the virtually preloaded applications 112 may comprise a unique application identifier. The unique application identifier may be used to determine the identity of the installable application and/or the repository containing the installable location. For example, the unique application identifier may comprise a package name. In an embodiment, a plurality of repositories may comprise various types of applications. In order to obtain the installable application corresponding to the virtually preloaded application 112, the unique application identifier may be used to identify a specific repository or repositories from the plurality of repositories that store applications (e.g., that store a plurality of installable applications). The unique application identifier may comprise an address, link, or other routing information for a particular repository. In some embodiments, the unique application identifier can be sent to a network server that may perform a lookup using the unique application identifier or a portion thereof to identify the repository storing the corresponding installable application.

The virtually preloaded applications 112 may be configured to perform one or more functionalities associated with the installation of corresponding installable applications in response to a selection of one or more interactive thumbnail images. For example, the virtually preloaded applications 112 may be configured to initiate the installation process for corresponding installable applications in response to selection of interactive thumbnail images representing the virtually preloaded applications 112. The virtually preloaded applications 112 may provide instructions and/or prompts to a user of the mobile communication device 102 throughout the installation process.

In some cases, virtually preloaded applications 112 that have not had their corresponding installable applications installed and/or have not received a selection input may prompt a user of the mobile communication device 102 to install the installable applications. The prompt may appear as a prompts asking if a user wants to update the virtually preloaded application 112. The prompt may comprise a textual prompt, a visual prompt, an image, an audible prompt, and/or some other prompt. For example, when an installable application corresponding to one of the virtually preloaded applications 112 has not been installed, the user may be prompted with a text box recommending installation, the user may be prompted with a text box recommending an update to the application, the interactive thumbnail image representing the virtually preloaded application 112 may start flashing, the interactive thumbnail image representing the virtually preloaded application 112 may become enlarged, or some other prompt may be presented to the user. The prompt may be presented after about one day, after about one week, after about one month, after about one year, and/or after some other period of time. In some cases, the virtually preloaded application 112 may be configured to prompt the user to install its corresponding installable application at predetermined intervals such as those listed hereinabove.

The virtually preloaded application 112 may be configured to facilitate the installation of the corresponding installable application in response to receiving an input from the user. In response to receiving an input, the virtually preloaded application 112 may execute on a processor on the mobile communication device 102 to identify a repository comprising the corresponding installable application, obtain user installation permission, and communication with the identified repository to obtain the installable application. The installable application can be installed at the request of the virtually preloaded application 112, or in some embodiments, the permission can be passed to the repository, which can initiate and/or carry out the downloading of the installable application to the mobile communication device 102. The installation process may execute in the background on the mobile communication device 102.

In an embodiment, the virtually preloaded application 112 may be configured to obtain the user's permission prior to installing the installable application. The permission may be presented as a prompt to update the application, to obtain and install a new application, or any other prompt for receive authorization to obtain and install the installable application on the mobile communication device 102. By asking for permission to update to or install the installable application, the user experience may be enhanced.

The virtually preloaded application 112 may also perform various other actions on the mobile communication device 102 as part of the installation process. For example, the virtually preloaded application 112 may execute on the processor to identify a location where the virtually preloaded application 112 is stored in memory and where the icon for the virtually preloaded application is located on a display screen of the mobile device 102, remove the icon from the location and place it into an application tray, save the installable application in the memory location of the virtually preloaded application 112, and place the icon for the installable application in the location in which the icon for the virtually preloaded application was located.

It is understood that an application tray may refer to an area or a screen that displays in a graphical user interface of the device 102 when a launcher function of the device 102 is activated by a user. The application tray may present images or icons representing a plurality of applications that may be activated and/or executed on the device 102 by touching or otherwise selecting the image or icon. In an embodiment, the application tray may present images or icons representing applications that have shortcuts on other screens of the device 102, for example shortcuts on the home screen of the device 102, as well as applications that do not have shortcuts. Thus, in an embodiment, the application tray may present images or icons for all the applications stored on the device 102. Because some users may install a large number of applications on the device 102, shortcuts for activating commonly used applications may be created in other screens of the device 102, for example in the home screen of the device 102, to make finding and activating these commonly used applications easier relative to locating the application among the large number of images or icons on the application tray. It is also understood that an application tray may refer to the memory or data structure as well as the functionality (e.g., executable logic) that lies behind the screen showing the images or icons for all the applications.

In some embodiments, the repository may be responsible for installing the installable application on the mobile communication device 102. In these embodiments, the virtually preloaded application 112 may determine where the installable application is installed and relocate the installable application and/or an icon or thumbnail image representing the installable application to the location previously associated with the virtually preloaded application 112.

In an embodiment, the virtually preloaded applications 112 may be configured to relocate from a position on the display of the mobile communication device 102 in response to installation of corresponding installable applications and/or in response to a user satisfying installation permissions for installable applications to be installed. For example, the virtually preloaded applications 112 may relocate to an application tray of the mobile communication device 102 in response to installation of corresponding installable applications. In some cases, upon installation, the installable applications may be landed in the spots from which the virtually preloaded applications 112 relocated. In an embodiment, the virtually preloaded applications 112 themselves may direct the landing of installable applications and/or may detect where installable applications are landed and relocate the installable applications from where they were dropped. During the installation process or after the completion of the installation process, the icon for the virtually preloaded application 112 and/or the virtually preloaded application 112 itself can be deleted from the mobile communication device 102.

In an embodiment, a tracking application may be configured to track and/or record interaction information for interactions between the user of the mobile communication device 102 and virtually preloaded applications 112. For example, a tracking application may track and/or record the selection frequency, movement by the user of the mobile communication device 102, removal from the display of the mobile communication device 102, and/or identify the location of the virtually preloaded application 112 and/or the installable application at the time it was selected. The tracking application may be configured to transmit interaction information to a third party such as a mobile service provider, an application provider, a data store, or to some other third party. In some cases, the virtually preloaded application 112 may track and/or record a portion of the interaction information itself.

Figure 2:
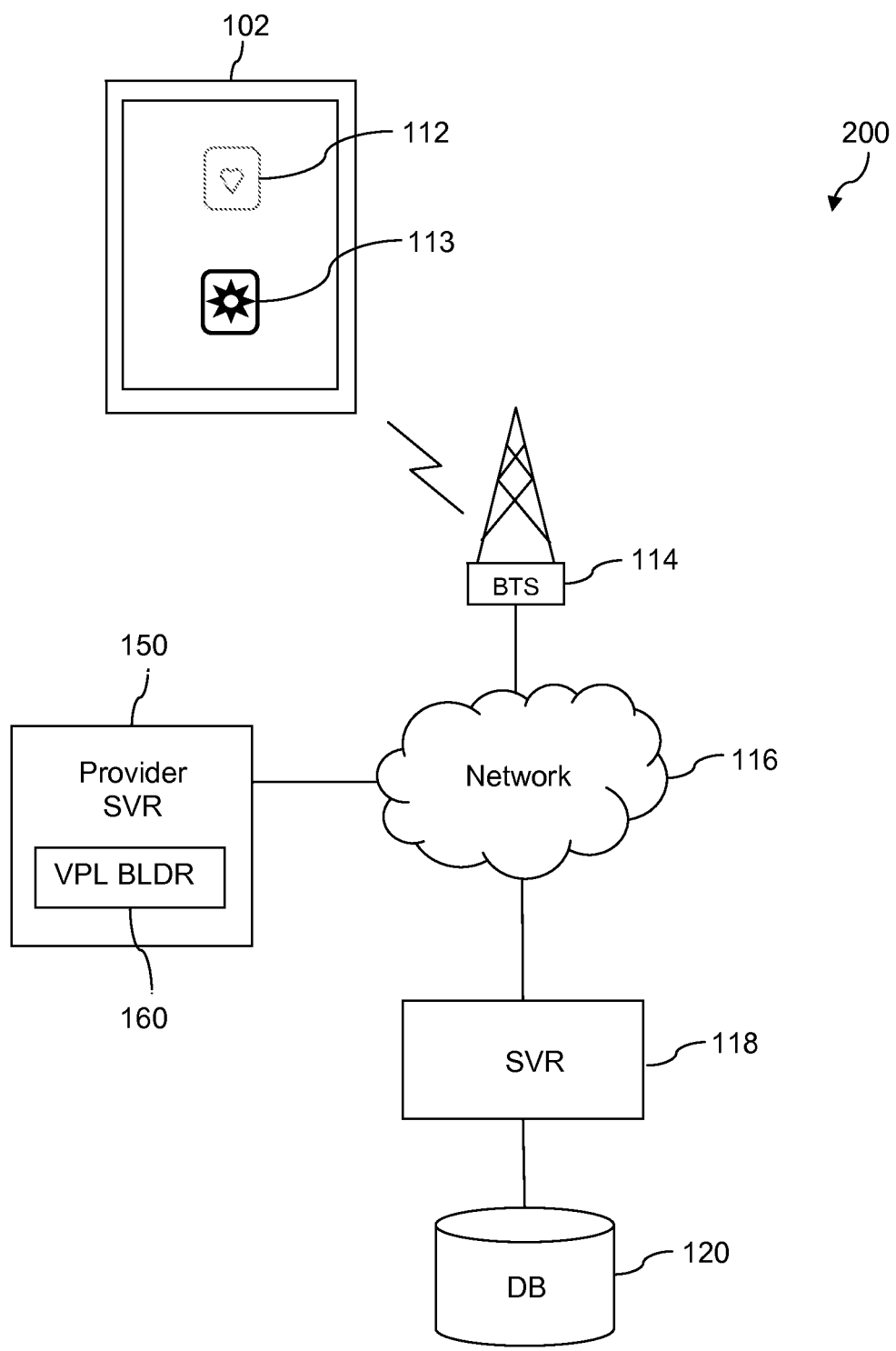
FIG. 2 is a diagram of a communication system according to an embodiment of the disclosure.

Turning now to FIG. 2, a communication system 200 is described. In an embodiment, the communication system 200 comprises the mobile communication device 102, a base transceiver station (BTS) 114, a network 116, a server (SVR) 118, a data store (DB) 120, and a service provider server 150. The service provider server 150 may comprise a virtual preload builder (VPL BLDR) 160. In an embodiment, the server 118 may comprise an application repository such as an application store or an application marketplace. Installable applications configured to be distributed through interactions with the server 118 may be stored in the data store 120. It is understood that the communication system 200 may comprise a plurality of mobile communication devices 102, a plurality of base transceiver stations 114, a plurality of networks 116, a plurality of servers 118, a plurality of data stores 120, and/or a plurality of service provider servers 150.

It should be understood at the outset that while FIG. 2 depicts the mobile communication device 102 as displaying a singular virtually preloaded application 112 and a singular installed application, the mobile communication device 102 may display any number of virtually preloaded applications 112 and/or any number of installed applications 113 including none at all. For example, the mobile communication device 102 may display six virtually preloaded applications 112 and two installed applications 113. In another example, the mobile communication device 102 may display ten virtually preloaded applications 112 and none of the installed applications 113. Different screens of the mobile communication device 102 may display different virtually preloaded applications 112 and/or different installed applications 113.

As discussed hereinabove with reference to FIG. 1, the virtually preloaded applications 112 may be represented on the display of the mobile communication device 102 in such a way that they may be distinguishable from the installed applications 113 and/or yet to be installed installable applications to which they correspond. Though FIG. 2, depicts the virtually preloaded application 112 as being represented by a slightly transparent or less than full color interactive thumbnail image, it is understood that the virtually preloaded application 112 may be represented in other ways.

In an embodiment, the virtual preload builder 160 may be configured to construct the virtually preloaded applications 112. While FIG. 2 depicts the virtual preload builder 160 as operating within the service provider server 150, it should be understood that in alternative embodiments the virtual preload builder 160 may be configured to operate on any number of different computer systems. The virtual preload builder 160 may receive an installable application or at least some portion of the installable application. The virtual preload builder 160 may parse the application file of the installable application available from an application repository to identify one or more of an application name associated with the installable application, a unique application identifier associated with the installable application, an icon, image, logo, symbol, etc. associated with the installable application, and/or to identify something else.

Virtually preloaded applications 112 may be constructed by the virtual preload builder 160 such that they comprise the unique application identifier, the application name, and the icons, logos, symbols, etc. associated with installable applications in an application repository. The icons, logos, symbols, etc., may be in the form of an interactive thumbnail images configured to call their respective virtually preloaded applications 112 upon selection by a user of the mobile communication device 102. A virtually preloaded application 112 carrying the unique application identifier, the application name, and the interactive thumbnail image associated with an installable application in an application repository may be said to correspond to the installable application.

The virtual preload builder 160 may construct the virtually preloaded applications 112 such that their application names correspond to application names of installable applications in an application repository. For example, a virtually preloaded application 112 that corresponds to an installable weather application may comprise a substantially similar application name to the installable weather application. In an embodiment, the virtual preload builder 160 may suffix the unique application identifiers of the virtually preloaded applications 112 such that they may be identifiable as virtually preloaded applications 112. For example, a virtually preloaded application 112 of "weatherapplication" may be suffixed as "weatherapplication.vpl," wherein ".vpl" may comprise a suffix that serves to identify the virtually preloaded application 112 as a virtually preloaded application 112.

The virtual preload builder 160 may also utilize the unique application identifier and data to create some functionality for the virtually preloaded application. Some of the base functionality of the virtually preloaded application may originate from a pre-existing installation routine or application. The virtual preload builder 160 may add functionality associated with the corresponding installable application (e.g., a splash screen, basic presentation, etc.). The resulting virtual application may then comprise instructions to allow it to execute on the processor, invoke various monitoring applications, identify and communication with the repository based on the unique application identifier, and obtain and install the installable application from the repository. Once the functionality for the virtual application is created, the virtual preload builder 160 may shut down and provide the virtual application for preloading on the mobile communication device 102.

In an embodiment, a user of the mobile communication device 102 may select an interactive thumbnail image that represents a virtually preloaded application 112 on the display of the mobile communication device 102. The interactive thumbnail image may call the virtually preloaded application 112, wherein the virtually preloaded application 112 may be configured to connect the user to an application repository. The virtually preloaded application 112 may connect the user to the server 118 and prompt the user to perform a full installation by satisfying installation permissions in order to install an installable application stored in the data store 120 to which the virtually preloaded application 112 corresponds. The virtually preloaded application 112 may be configured to guide the user through the installation process.

The virtually preloaded application 112 may detect that the user has begun installation and satisfied installation permissions for its corresponding installable application. The virtually preloaded application 112 may be configured to relocate itself and/or an icon from its location on the display of the mobile communication device 102 in response to the detection. The virtually preloaded application 112 may relocate to an application tray of the mobile communication device 102, to another screen of the mobile communication device 102, or to another location.

Relocation may make room for the installable application to be landed in a location on the display of the mobile communication device 102. In some cases, landing an interactive thumbnail image of the installable application that is configured to link to the installable application may be considered to be landing the installable application. Landing an installable application may be controlled by its corresponding virtually preloaded application 112. For example, a virtually preloaded application 112 may be configured to determine the location at which to land its corresponding installable application and/or the virtually preloaded application 112 may be configured to detect where its corresponding installable application was dropped and may then relocate it in some instances.

In some cases, an installable application may be landed in a location vacated by its corresponding virtually preloaded application 112. The interactive thumbnail image representing the installed installable application may identify to the user of the mobile communication device 102 that the installable application has been installed. For example, the interactive thumbnail image representing the installed installable application may be a full color or non-transparent version of the interactive thumbnail image representing the virtually preloaded application 112 that corresponds to the installed installable application.

Figure 3:
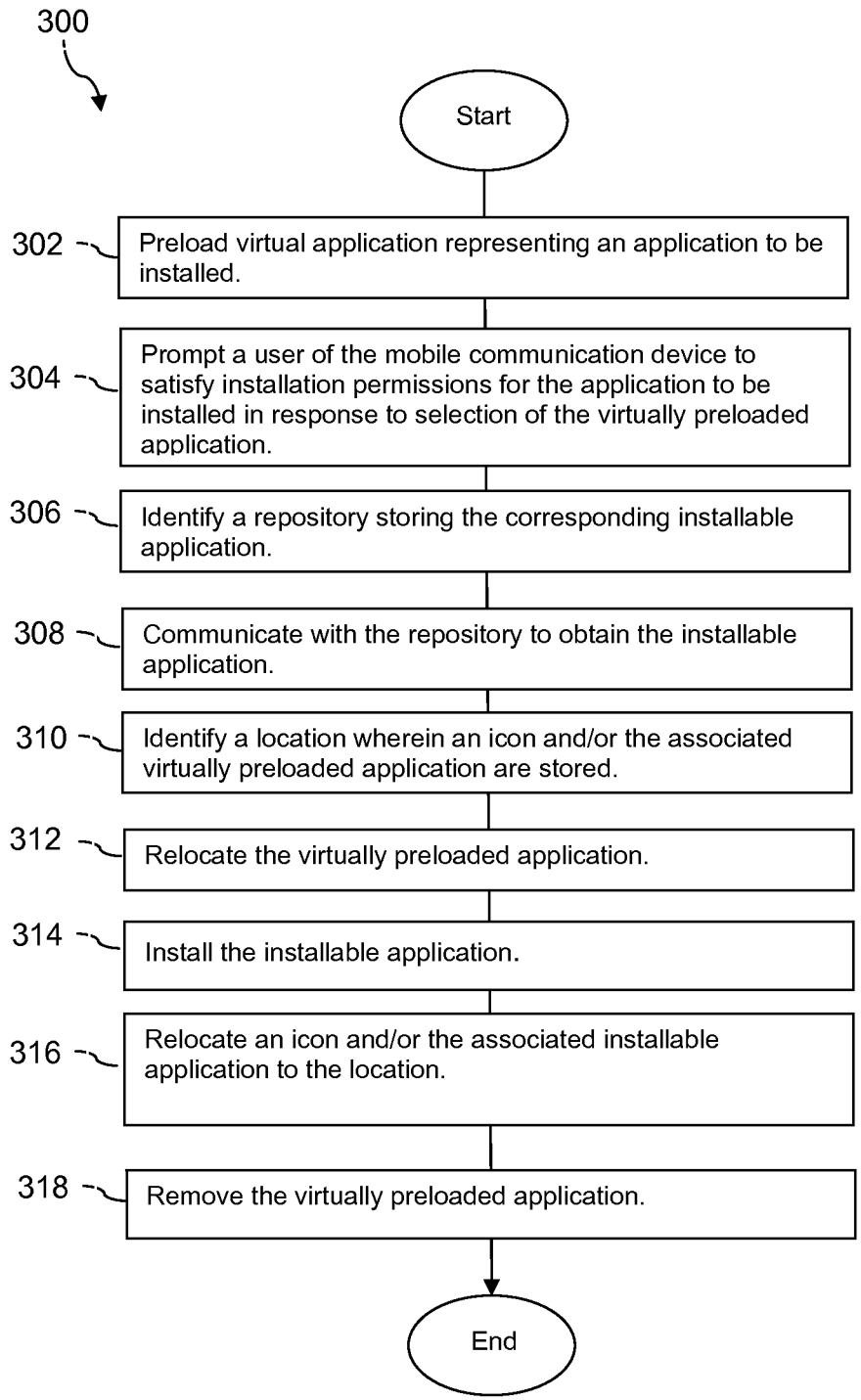
FIG. 3 is a flowchart of a method according to an embodiment of the disclosure.

Turning now to FIG. 3, a method 300 is described. In an embodiment, the method 300 may be performed by one or more components of the mobile communication device 102 or the communication system 200 described hereinabove with reference to FIG. 1 and FIG. 2. At block 302, a virtual application representing an application to be installed may be preloaded on a mobile communication device. In an embodiment, a virtually preloaded application 112 comprising a similar interactive thumbnail image and/or icon to an installable application to be installed may be said to represent the application to be installed. Similarly, a virtually preloaded application 112 comprising the same application name as an application to be installed may be said to represent the application to be installed. In some contexts, a virtually preloaded application 112 that represents an application to be installed may be said to correspond to the application to be installed. The virtually preloaded application 112 may be loaded prior to a user receiving the mobile communication device 102, as part of an initial provisioning of the mobile communication device 102, and/or as part of an update process for the mobile communication device 102. Once a user has the mobile communication device 102, the virtually preloaded applications 112 may represent applications that are available to a user without being fully installed on the mobile communication device 102. In this sense, the virtually preloaded applications represent options for the user while presenting low overhead installations on the mobile communication device 102. At block 304, a user of the mobile communication device 102 may be prompted to satisfy installation permissions for the application to be installed. For example a user of a mobile communication device on which the virtually preloaded application is stored may be prompted, by the virtually preloaded application in response to selection, to perform a full installation and satisfy installation permissions in order to install the application. In some embodiments, the user may be prompted without a selection of the virtually preloaded application. The prompt may include a request for a full installation, an update to an existing application, a request for a system update, or the like. An input may be received on the mobile communication device 102 indicating an acceptance from the user (e.g., providing permission to install the installable application). If a permission is not received, the method may end without installing the installable application.

The virtually preloaded application 112 may execute in response to receiving an input comprising permission to install the installable application. In response to receiving the input, the virtual preloaded application 112 may identify a repository comprising the installable application corresponding to the virtual preloaded application 112 as step 306. The repository may be identified from the unique application identifier stored within the virtually preloaded application 112 and/or the unique application identifier may be sent to a network component that is configured to look up and route the request for the installable application to the corresponding repository. At step 308, the virtually preloaded application 112 may communicate with the identified repository to initiate the installation of the installable application. In an embodiment, the repository may carry out the installation and routing of the installable application to the mobile communication device 102.

At step 310, the location of an icon representing the virtually preloaded application and/or the location in memory of the virtually preloaded application itself may be identified. In order to allow the installable application to replace the virtually preloaded application 112, the virtual preloaded application may be relocated at step 312. In some cases, the virtually preloaded application 112 may be relocated in order to make room for the application to be installed. The virtually preloaded application 112 may be relocated in response to the installation permissions being satisfied. The virtually preloaded application 112 can be relocated to various locations within the mobile communication device 102 such as the application tray, or another location in memory. In some embodiments, the virtual preloaded application and/or the icon representing the virtual preloaded application 112 may be relocated in a non-viewable location on the mobile communication device 102.

At block 314, the installable application may be installed on the mobile communication device 102. In some embodiments, the installable application may be installed in the location previously occupied by the virtually preloaded application.

When the installation of the installable application is controlled by the repository, the installable application may not be installed in the same location as the virtually preloaded application. In this even, the virtually preloaded application 112 may identify where the installable application is installed on the mobile device 102. The virtual preloaded application 112 may also identify where the icon or thumbnail shortcut linking to the installable application is located on the mobile communication device. The virtual preloaded application 112 may then relocate the icon and/or the installable application to the location previously occupied by the virtually preloaded application in step 316.

At step 318, the virtually preloaded application 112 may remove itself and/or its icon from the mobile communication device 102. In general, the virtually preloaded application 112 may remain on the mobile communication device 102 until the installation is complete in order to perform the various steps carried out by the virtually preloaded application. However, the icon representing the virtually preloaded application can be deleted rather than being relocated at step 316. In addition, when the icon or thumbnail representing the installed application is selected, the full version of the application (e.g., the installed application) may execute on the mobile device 102.

In an embodiment, the method 300 may further comprise recording virtually preloaded application information as described hereinabove. In some embodiments, the virtually preloaded application 112 may initiate or activate various tracking applications to record or track the selection of the virtually preloaded application, the installation of the installable application, any subsequent use of the installed application, and/or any deletions of the virtually preloaded application and/or the installed application. For example, an application provider may compensate a mobile communication service provider for each application installed using the virtually preloaded application. By tracking and reporting the installation of the installed application via the virtually preloaded application, the mobile communication service provider may receive compensation for the installation.

Figure 4:
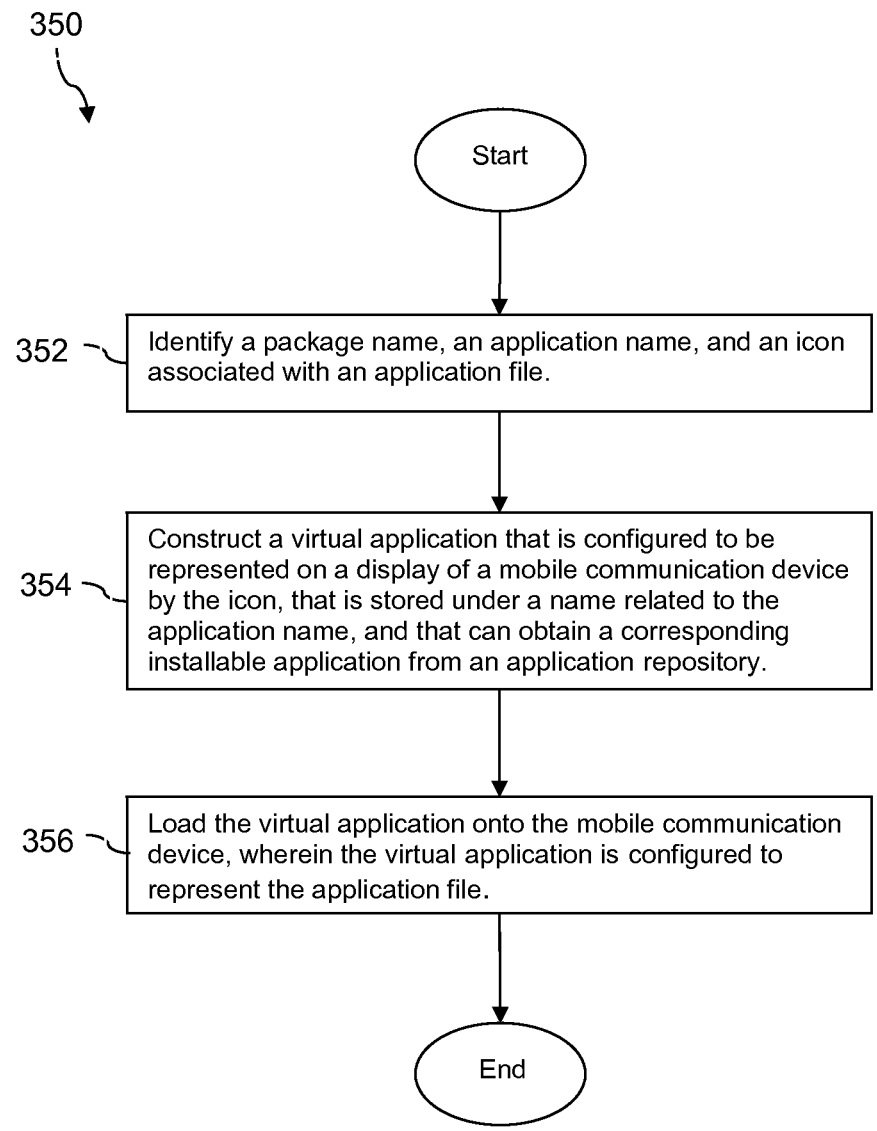
FIG. 4 is a flowchart of a method according to an embodiment of the disclosure.

Turning now to FIG. 4, a method 350 is described. In an embodiment, the method 350 may be performed by one or more components of the mobile communication device 102 or the communication system 200 described hereinabove with reference to FIG. 1 and FIG. 2. For example, the method 350 may be performed by the virtual preload builder 160 described with reference to FIG. 2.

A unique application identifier, an application name, and an icon associated with an application file may be identified at block 352. The application file may correspond to an installable application stored in an application repository. A virtual application may be constructed at block 354. The virtual application may be constructed based on the identified unique application identifier, application name, and icon of the application file. In an embodiment, constructing the virtual application may comprise suffixing a unique application identifier of application file in order to identify the virtual application as a virtual application.

The virtual application may be configured to be represented on a display of a mobile communication device by the icon, to be stored under the application name, and to link to an online application store from which the application file can be installed. In some cases, the virtual application may be configured to prompt a user of the mobile communication device to install the application file after a predetermined amount of time without being selected. The virtual application may be loaded onto the mobile communication device at block 356. The virtual application may be configured to represent the application file on the display of the mobile communication device. In an embodiment, the virtual application may be loaded onto the mobile communication device as part of an interface and applications pack downloaded by a user of the mobile communication device.

Figure 5:
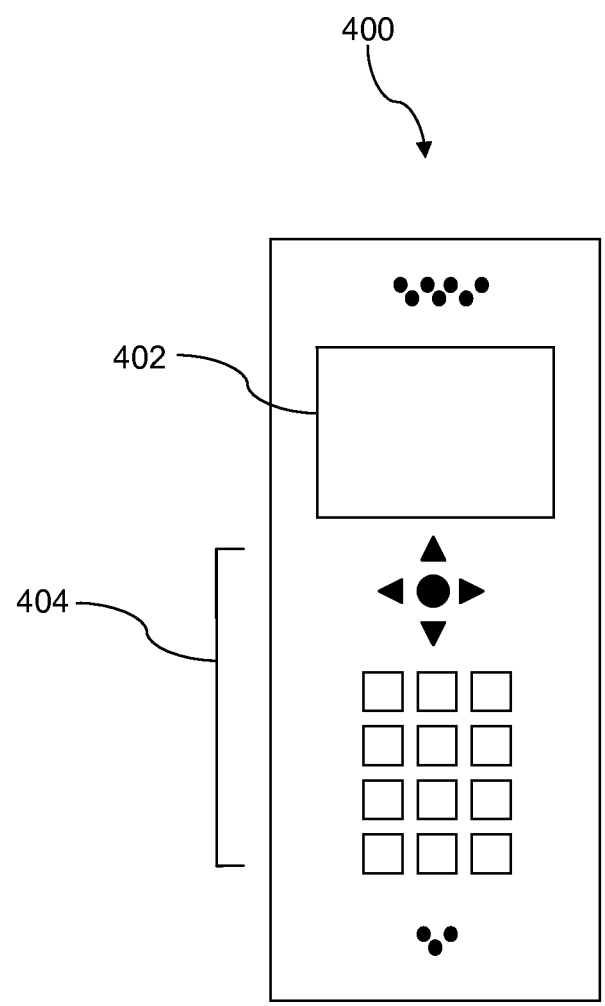
FIG. 5 is an illustration of a mobile device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
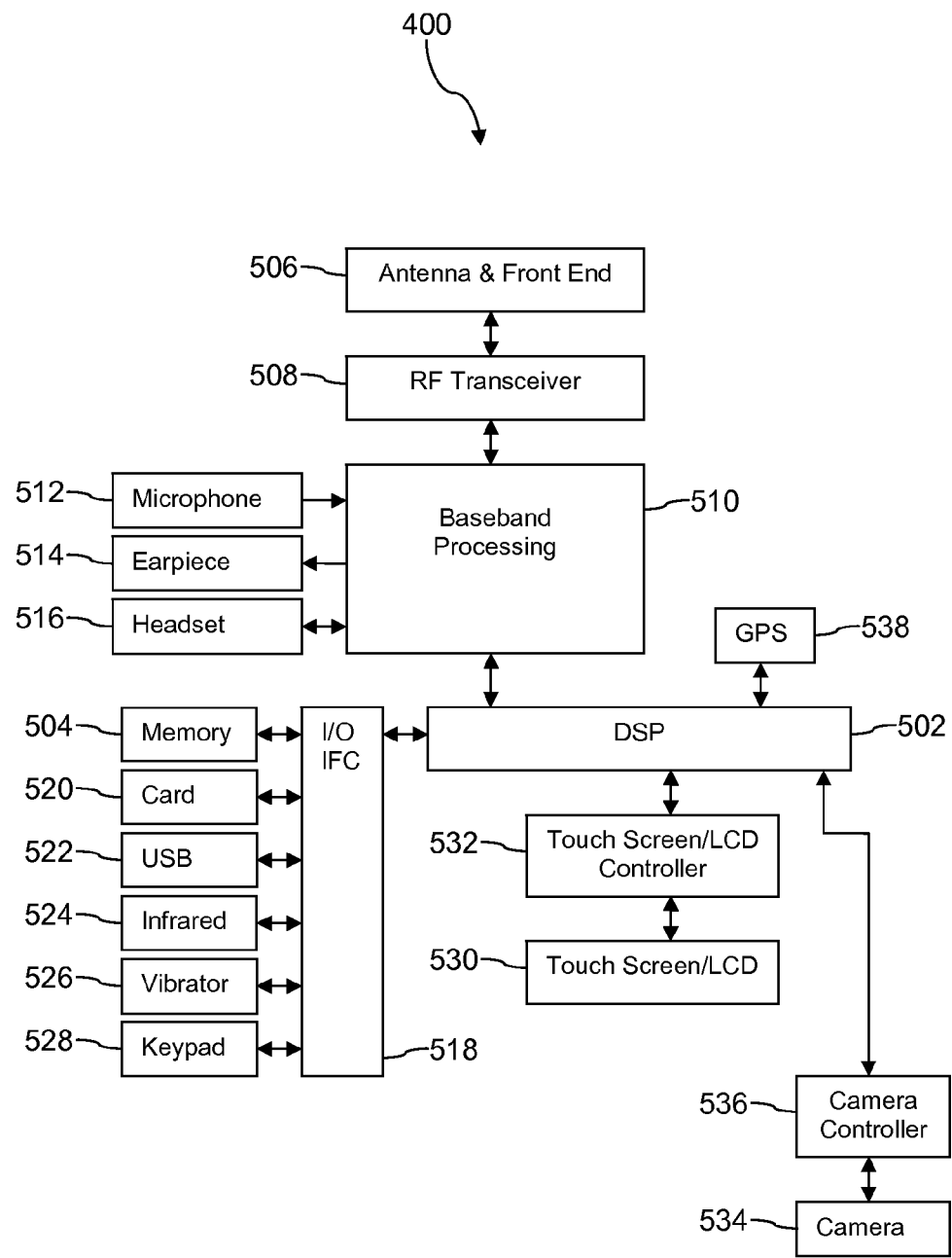
FIG. 6 is a block diagram of a hardware architecture of a mobile device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
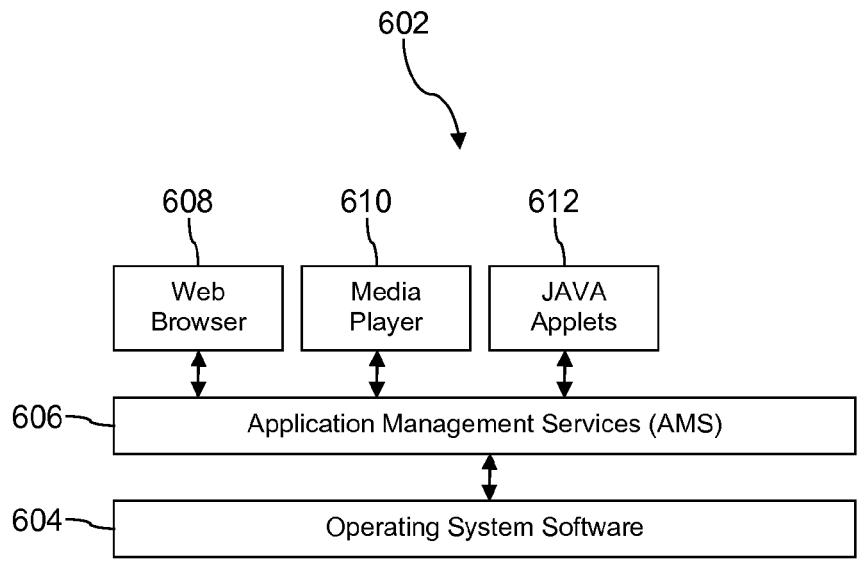
FIG. 7A is a block diagram of a software architecture of a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
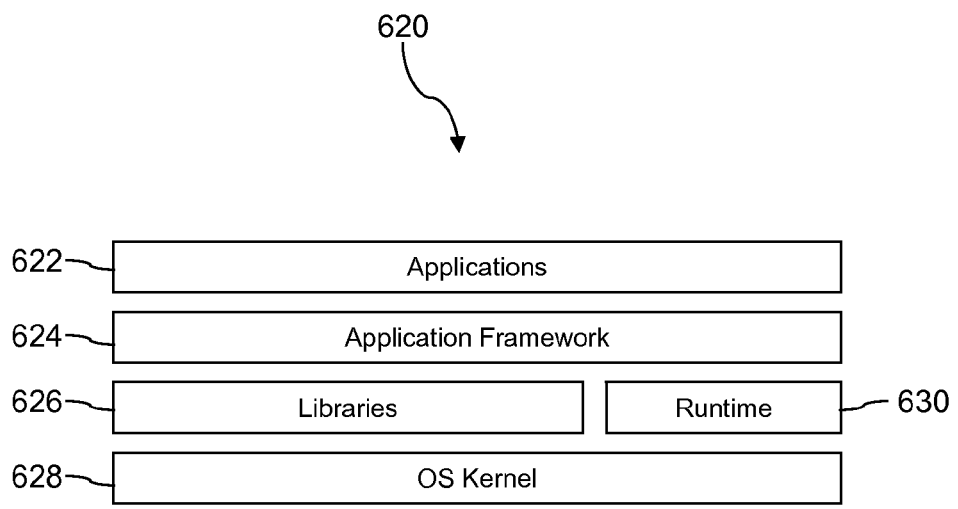
FIG. 7B is a block diagram of another software architecture of a mobile device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626. While one embodiment of a software environment 620 depicting a high-level schematic view of a software block diagram on a computing device is illustrated in FIG. 7B, different software operating environments or software stacks may be also used in various embodiments.

Figure 8:
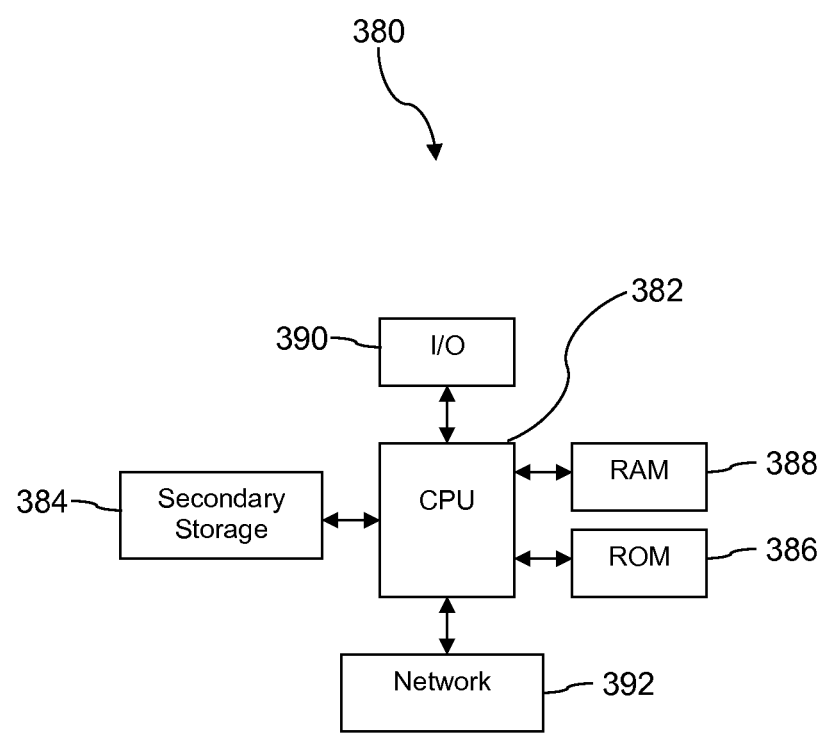
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer specification 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of installing a full application on a mobile communication device, comprising:
   receiving, on a mobile communication device, a selection of a virtually preloaded application having functionality independent of the full application, the virtually preloaded application being one of a plurality of virtually preloaded applications on the mobile communication device, wherein the virtually preloaded application is loaded onto the mobile communication device and comprises an interactive thumbnail image associated with the full application, and wherein the full application is not yet installed on the mobile communication device but is available for installation from a repository;
   in response to the selection of the virtually preloaded application via the interactive thumbnail image:
      identifying, by the mobile communication device, the repository comprising the full application from a plurality of repositories;
      obtaining, by the mobile communication device, the full application from the repository;
      installing, by the mobile communication device, the full application in a non-transitory memory of the mobile communication device;
      identifying a first location of the interactive thumbnail image displayed by the virtually preloaded application on the mobile communication device;
      replacing, on the display at the first location, the interactive thumbnail image displayed by the virtually preloaded application with a full application icon corresponding to the full application; and relocating the interactive thumbnail image displayed by the virtually preloaded application from the first location to a second location on the display of the mobile communication device, wherein the full application is displayed at the first location; and after a predetermined amount of time without one of the plurality of virtually preloaded applications being selected, prompting, by the one of the plurality of virtually preloaded applications, a user of the mobile communication device to install a corresponding full application associated with the one of the plurality of virtually preloaded applications.

2. The method of claim 1, further comprising: requesting, by the mobile communication device, an installation permission corresponding to the full application; and receiving the installation permission on the mobile communication device, wherein identifying the repository and installing the full application are based on receiving the installation permission.

3. The method of claim 1, wherein relocating the interactive thumbnail image displayed by the virtual preloaded application comprises relocating the interactive thumbnail image to an application tray.

4. The method of claim 1, further comprising:
identifying an initial location of the full application icon associated with the full application; and
relocating the full application icon to the first location.

5. The method of claim 1, further comprising:
identifying a first virtually preloaded application location of the virtually preloaded application on the mobile communication device, wherein the first virtually preloaded application location comprises the location at which the virtually preloaded application is stored on the mobile communication device;
identifying an initial installation location of the full application; and
relocating the full application from the initial installation location to the first virtually preloaded application location.

6. The method of claim 1, further comprising: removing the virtually preloaded application from the mobile communication device.

7. The method of claim 1, further comprising:
tracking interaction information for the virtually preloaded application.

8. The method of claim 7, wherein the interaction information comprises one or more of the selection frequency of the virtually preloaded application, movement of the virtually preloaded application by a user via a display of the mobile communication device, or the location of the virtually preloaded application at the time it was selected.

9. The method of claim 1, wherein installing the full application comprises presenting, via the display of the mobile communication device, instructions for performing the full install of the full application on the mobile communication device.

10. The method of claim 1, wherein the interactive thumbnail image displayed by the virtually preloaded application is configured to indicate that the virtually preloaded application has not been replaced by a fully installed application.

11. The method of claim 10, wherein the interactive thumbnail image displayed by the virtually preloaded application appears as less than full color before the full application is installed on the mobile device.

12. A method of virtually preloading an application on a mobile communication device, comprising:
receiving, by a server, a full application file;
identifying a unique application identifier, an application name, and an interactive thumbnail image associated with the full application file;
constructing, by the server for the mobile communication device, a virtual application corresponding to the full application file based on the unique application identifier, the application name, and the interactive thumbnail image, the virtual application being one of a plurality of virtual applications on the mobile communication device, wherein the virtual application is configured to be represented on a display of the mobile communication device by the interactive thumbnail image corresponding to the full application file, wherein the virtual application is stored under a name related to the application name, and wherein the virtual application identifies a repository comprising the full application file based on the unique application identifier;
prior to installation of the full application file on the mobile communication device, loading the virtual application onto the mobile communication device via the server such that the virtual application represents the full application file as being on the mobile communication device and the virtual application initiates installation of the full application file onto the mobile communication device from the repository in response to selection of the virtual application, wherein the virtual application has functionality independent of the full application that is available for installation on the mobile communication device;
in response to selection of the virtual application via the interactive thumbnail image, replacing, on the display of the mobile communication device, the interactive thumbnail image displayed by the virtual application with a full application icon corresponding to the full application file; and
after a predetermined amount of time without one of the plurality of virtual applications being selected, prompting, by the one of the plurality of virtual applications, a user of the mobile communication device to install a corresponding full application associated with the one of the plurality of virtual applications.

13. The method of claim 12, wherein constructing the virtual application comprises suffixing the unique application identifier of the application file with a suffix configured to indicate a virtual application.

14. The method of claim 12, wherein the virtual application is loaded as a part of an interface and applications pack downloaded to the mobile communication device.

15. A method of tracking an application installation on a mobile communication device via a virtually preloaded application, comprising:
receiving, on a mobile communication device, a selection of the virtually preloaded application that is loaded onto the mobile communication device, the virtually preloaded application being one of a plurality of virtually preloaded applications on the mobile communication device, wherein the virtually preloaded application corresponds to a full application that is not yet installed on the mobile communication device but is available for installation from a repository;
in response to the selection of the virtually preloaded application, identifying, by the mobile communication device, the repository having the full application from a plurality of repositories based on the selection of the virtually preloaded application;

obtaining, by the mobile communication device, the full application by communicating with the repository;

installing, on the mobile communication device, the full application on the mobile communication device;

replacing, on the display of the mobile communication device, an interactive thumbnail image displayed by the virtual application with a full application icon corresponding to the full application;

tracking, by a tracking application on the mobile communication device, the selection of the virtually preloaded application and the installation of the full application on the mobile communication device; and after a predetermined amount of time without one of the plurality of virtually preloaded applications being selected, prompting, by the one of the plurality of virtually preloaded applications, a user of the mobile communication device to install a corresponding full application associated with the one of the plurality of virtually preloaded applications.

16. The method of claim 15, further comprising:
receiving a selection to activate the full application on the mobile communication device; and
tracking the selection to activate the full application.

17. The method of claim 15, further comprising:
receiving a selection to delete at least one of the full application or the virtually preloaded application from the mobile communication device; and
tracking the selection to delete the at least one of the full application or the virtually preloaded application.

18. The method of claim 15, wherein tracking the at least one of the selection of the virtually preloaded application or the installation of the full application on the mobile communication device comprises:
recording the selection or installation; and
reporting the selection or installation to a mobile communication provider.

19. The method of claim 15, further comprising: activating the tracking application in response to receiving the selection of the virtually preloaded application.

* * * * *